N. HAWKES.
Cultivator.
No. 58,819.                                    Patented Oct. 16, 1866.
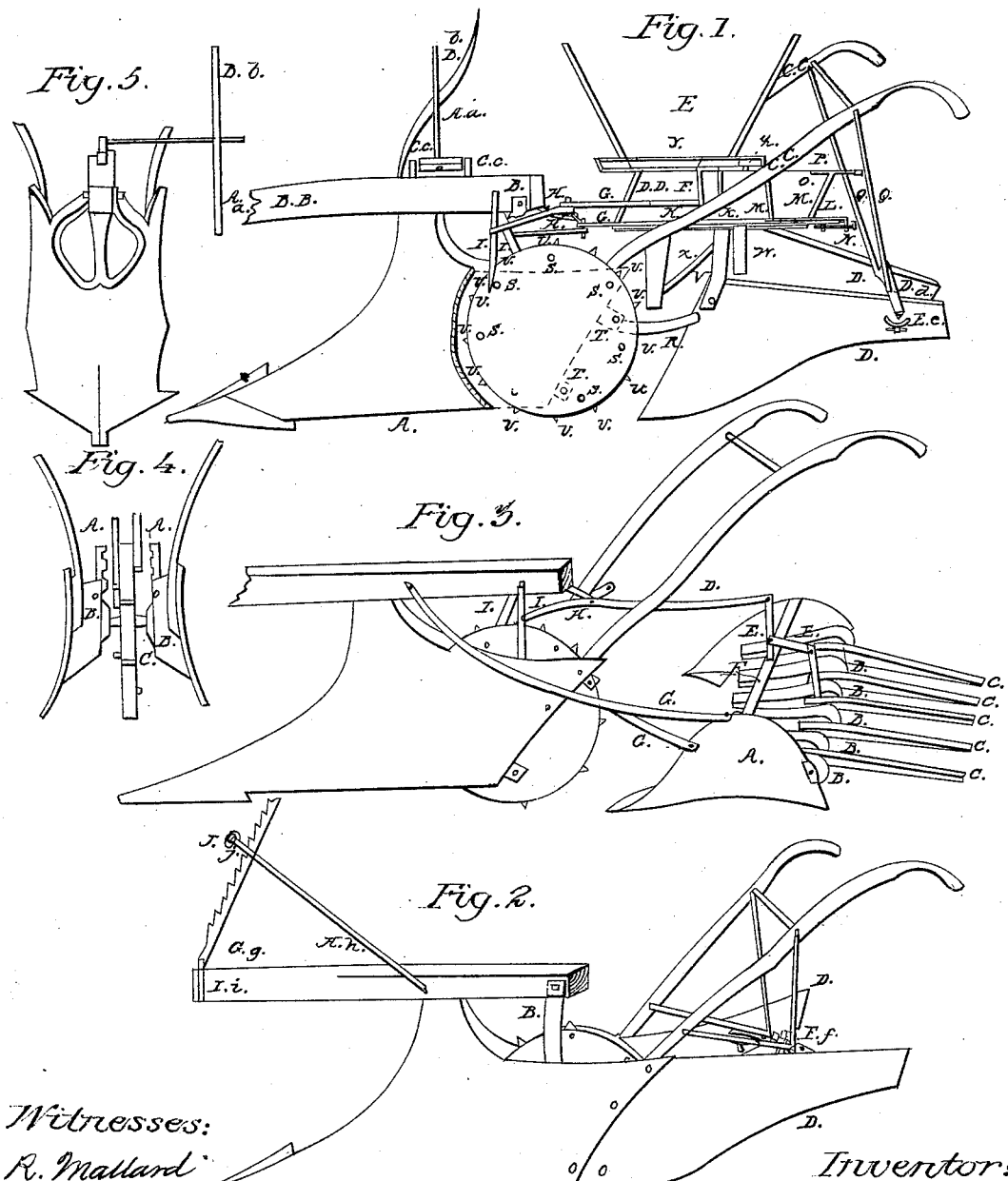
Witnesses:
C. R. Mallard
L. W. Howg
Inventor:
Nathan Hawes

UNITED STATES PATENT OFFICE.

NATHAN HAWKES, OF APPLETON, MAINE.

IMPROVEMENT IN COMBINED CULTIVATOR AND DITCHER.

Specification forming part of Letters Patent No. 58,819, dated October 16, 1866.

*To all whom it may concern:*

Be it known that I, NATHAN HAWKES, of Appleton, in the county of Knox and State of Maine, have invented a new, useful, and Improved Horse Planter, Hoer, Digger, and Ditcher; and I do hereby declare that the following is a full, clear, and exact description of the construction and operation of the same, reference being had to the accompanying drawings, and to the letters of reference marked thereon, which make a part of this specification, in which—

Figure No. 1 is a side view of it as a planter. Fig. No. 2 is a side view of it as a hoer and ditcher. Fig. No. 3 is a side view of it as a digger. Fig. No. 4 is an aft view of the wheel C, represented in Fig. No. 1. Fig. No. 5 is a front view when standing fronting the forward end.

First, A, B B, and C C in Fig. 1 represent the mold-boards, point, beam, and handles of a double mold-board plow, (somewhat like the common double mold-board plow,) which forms a part of this machine. C is a wheel, about eleven inches in diameter, fastened midway between said mold-boards A and under the aft part of said plow, and made to run toward the point of the plow as the machine moves, and so fastened that it may be elevated or lowered, as hereinafter described, as convenience may require, (as the soil is light and loose or heavy and hard.) Said wheel turns on pivots which are a part of it, and are inserted into blocks of iron, which are made to slide up and down in the sockets B, fastened to said mold-boards, on the inside thereof, and to the beam B B, on either side of said wheel, as represented in Fig. 4, A representing said blocks, which blocks are kept at any required point in said sockets by a pin through the aft side of them inserted into holes or gains in said blocks. Said wheel makes the machine move through the soil when in operation more easily than without it, and steadies the plow, and also causes and regulates the dropping of the seed when the machine is used as a planter.

D are two side-boards of iron, made to follow aft said mold-boards, as in Fig. 1, when the machine is used as a planter, and are intended to cover the seed, dropped as hereinafter described, and are each fastened forward by a strap of iron, R, screwed onto them near the upper side on the inside, and to the upper hinges, T, which hinges are screwed onto the aft part of said mold-boards A, the lower forward ends of which side-boards D are kept a little wider apart than the lower aft ends of said mold-boards by a bowing strap of iron screwed onto the the outer upper side at the same point where the strap R is fastened, and by the same screw; and the upper aft ends of said side-boards D are brought and kept near together by the bowing strap of iron D *d*, which extends over the upper edge of said side-boards D, and is fastened at either end to them by passing either end of said strap D *d* through the eyes E *e* on the outer and upper side and aft end of said side-boards, and made fast in said eyes by a key; and in order to keep said side-boards otherwise in place, and to lower or elevate them as occasion may require, they are made fast to the handles of the machine by the strap of iron G, made in a bowing shape, the ends of which are made fast to said handles by the rod which passes through said handles passing also through the said ends of said strap G, the bow end of said strap G being fastened to said strap D *d* by a screw passing up through the middle of the bowing parts of said straps D *d* and G, with a nut on the upper end to keep the screw in place, and by turning which nut said aft ends of said side-boards may be elevated or lowered at pleasure, in order to cover the seed more or less deep, as may be desired.

As the machine moves forward, and the plow makes a furrow on either side, the forward ends of said side-boards, extending to the outside of the furrows and nearing each other at their aft ends, scoop the soil in over the seed, and leave the soil of the row of seed, when covered, in an oval form, by said side-boards being brought nearer together at their upper edges than the lower, and the aft ends being brought nearer together than the forward ends.

To construct the machine for hoeing or ditching, change each of said side-boards D to the opposite side from what they are used in the planter, (represented in Fig. No. 1,) and invert them, and fasten them to the mold-boards A by the hinges, nuts, and screws T, to which mold-boards, when they are thus placed, said side-boards are made to fit, and thus form lengthened or a continuation of the mold-boards, as represented in Fig. No. 2; and the hind ends of said side-boards D, when thus placed and used, are kept apart the distance desired by two straps of iron, which meet and lap over each other, and fastened together by a bolt or screw passing through them with a nut on one end of the bolt or screw, which straps are turned or bent at nearly a right angle at the other ends, so as to fit those ends in and through the eyes E e, and there fastened by keys; and the ends of said strap, which thus meet and lap over each other, and are fastened together by a bolt or screw, as aforesaid, have several holes for said bolt, at different distances from the ends, in order to bring the hind ends of said side-boards D nearer together or farther apart, as desired; and to keep those straps thus fastened together in a line perpendicular to each other there is a bowing strap of iron fastened to them by means of the bolt which passes through them, also passing through the bow end of said bowing strap, the ends of which last-mentioned strap being fastened to said handles C C. A model of these last-mentioned straps, as they are all three fastened together, accompanies the model of the machine.

T are two hinges, fastened by a screw to the inside aft end of said mold-boards, near the upper and lower corners, and by means of which said side-boards D are fastened to said mold-boards, as before mentioned, when the machine is used to hoe or ditch.

E is the seed-box for potatoes or other coarse seed to be planted, open at the bottom, made larger at top than bottom, resting upon another shoal oblong box, Y, of same width, with a hole in the forward part to let the seed through into the lower seed-box, F.

D D is an oblong box, the aft end resting on a strap of iron fastened to said handles C C, and the other end resting on one of the rounds that connect said handles together near where they are fastened to the mold-boards, which oblong box is some thirteen inches long, five inches wide, and ten inches high, divided crosswise into three parts by thin partitions, the hind one, O, being for the small seed, the forward one, F, (which is larger at bottom part than top,) for the coarse seed, like potatoes, and the middle part the place where the small seed is drawn to from said part O in order to be dropped through the tube W.

X is a three-sided tube, open on the aft side, open at top and bottom, and fastened to the under side of the seed-box F at the forward end, simply to direct the seed down to the ground as it falls through the lower slide.

M is a hole through the lower slide G at a point where it will be in the center of the seed-box O when said slide is run clear back, which hole with the bottom of said box forms a dish, in which the small seed is drawn from said box and dropped into said tube W when said slide G is carried forward by the turning of the wheel C aft, and forming one side of said hole M is a narrow movable piece, same width as said hole, fitted into said slide G, made to slide back or forward, in order to make said seed-dish larger or smaller, as desired, to drop more or less seed at a time, by means of a screw through a piece fastened to the aft end of said slide G, on the under side, and so through another piece, fastened to the under side of said narrow movable piece.

P is the cover of the seed-box O, made to slide in grooves from the aft end on either side of the upper part of the box. Z is a kind of shuttle, with a hole in it for the seed to fall through, made to move back and forth in said shoal-box Y to hit the seed and knock it through, as it may clog in going from the box E into the lower seed-box, F. The bottom of the seed-box F is open, except as it is closed by the slides G. Said shuttle Z is moved back and forth as the wheel C turns by means of a rod or lever, the lower end of which is fastened to said lower slide G, and the upper end into the lower side of said shuttle, and a fulcrum is made by a pin passing through it near the upper end, and made fast in the sides of the long box D D in said middle part.

The wheel C has cogs U, a few inches apart, all around on its outer edge, to keep it from sliding as it turns. It also has near its outer edge pins S, alternately on one side and the other, a certain distance apart, according to the distance apart desired for the seed to be dropped. As the wheel turns the seed from either box will be dropped the same distance apart that it is from one pin to another on one side of the wheel, following the rim, as will appear hereinafter.

To either side of the beam B B, and just forward of the center of said wheel, are hung by a bolt through said beam, and secured by nuts on the ends of the bolts, two rods of iron, I, reaching down just below said pins S, made a little rounding near the lower ends on the side which comes against the pins as the machine moves forward, so as to make them run smooth over said pins. To said rods of iron J are screwed on the arms H between said beam and said wheel, the one on the left-hand side of said beam standing aft the machine, being connected at the other end with the upper slide G at its left-hand forward corner by a bolt and nuts, and the one on the right hand of said beam being connected with the lower slide G at its right-hand forward corner in the same manner. To the aft end of said beam B B is attached a tongue of iron by straps of iron running forward on and fastened to either side of said beam B B, and outside of said rods I, thus keeping them in place, and also fastened to the aft end of said beam, which tongue runs back midway between the forward ends of said slides G, and with the aft end of said tongue is connected a crank between the slides G, and fastened at its ends to said forward corners of said slides G by the same bolts which hold said arms H, one part of said crank being on the upper, the other on the under, side of said tongue. Said corners of said slides G, where said bolts fasten said arms, jut out to the right and left respectively, thus making said slides wider at their forward ends. Said slides G have valves through them corresponding to the opening in the bottom of said seed-box F, so arranged that when the upper slide G is drawn clear forward, and its valve comes under the opening of the seed-box F, the valve in the lower slide G is carried aft, making a tight bottom, so that the seed cannot drop through them, but may drop down from the seed-box F onto the floor of the lower slide G, forward of its valve. When one of said valves opens the other shuts, and they are each alternately opened and shut as said slides are alternately carried backward and forward, as the wheel C turns, as the machines moves forward, and thereby moves back and forth said strips I, and thus moves back and forward said slides G, with which they are connected, as before described. The lower ends of said strips I are carried forward alternately by coming against said pins on said wheel, and forward to the point where they pass over the pins, and in that way draw after them the slides G, with which they are respectively connected; and the pins being located on the wheel, as before described, when one of said slides is forced forward the other is forced back, and in that way, when the upper slide goes forward, its valve is opened and lets the seed onto the floor of the lower slide, and then as the upper slide goes back its valve is closed and the lower slide goes forward, and in that way brings its valve open, so as to let the seed drop what is below the upper slide, thus dropping a quantity of seed from the box F every time the lower slide goes forward; and in the same way, if seed is being dropped from the seed-box O, what the dish M will hold is drawn out from the seed-box O and dropped through the tube W every time the lower slide goes forward, and the dish is carried back and filled again every time said lower slide goes back.

On the under side of the forward part of the upper slide G, just forward of its valve, is a thin movable slide, made to run fore and aft in grooves cut in either side of said seed-box F, the purpose of which is to lessen the size of the valve in said upper slide G at pleasure when said slide G is carried forward by bringing its aft end farther back than the forward end of the said valve. Said valve is thus lessened in size as the seed may be coarse or fine, or as it is desired to drop more or less pieces at a time. Said thin movable slide is drawn back by means of a small cord fastened to it on either side and running back in said grooves in which it runs, and fastened to a pin running through the middle part of said oblong box D D and between the slides G, which pin may be turned by a thumb-screw, and the cord thus wound round the pin and the slide drawn back, covering a part of said valve when open. Said thin movable slide is pushed forward again when it is desired by putting a stick down into the valve and pressing it forward and turning the thumb-screw back.

More or less of the pins S may be placed in said wheel C as it is desired to drop the seed a greater or less distance apart.

To the top of the beam B B, near the aft end, is attached the marker, which is to mark the line on one side or the other, when the machine is used as a planter, where the next row is to be planted. It is constructed thus: Insert a roller, a few inches long, into two little uprights, C c, set in said beam B B, so that the roller will lie lengthwise with said beam. Make a hole through the roller at right angle with said beam, and insert the rod A a, and on this run the rod B b by means of a hole through the rod B b, midway from end to end of it, made to fit close to the rod A a, and may be kept in place by pins or keys.

To indicate the line where the next row is wanted, place the rod B b on the rod A a the distance off from the beam B B desired for the next row, and let one of its ends drag, making the line.

To use the machine as a digger of potatoes, remove the side-boards D, used for hoeing, and the straps connecting them with the machine, and the seed-boxes and slides, and fasten the digger (represented in Fig. 3) to said beam B B, which digger is constructed and operated as follows: It consists of two upright nearly triangular-shaped side pieces, A, Fig. 3, the longest sides resting on the ground, with a point on the forward ends somewhat like the point of a common plow, which makes a part of said side pieces, the shear or cutting part of said point, which runs parallel with the ground and a little lower than the plow, and cuts the soil on either side of the row to be dug, being on the inside of said side pieces. Said side pieces, A, are placed a sufficient distance apart to cover the row, and connected and held together by a rod of iron near the bottom or ground side, and at the top by another rod or strip of iron, F, extending from one to the other, and fastened to them by letting the top parts or points through the ends of the rod F, and kept so by keys over said rod F where said points go up through. In the same way the arms G are fastened to the tops of said side pieces, the tops or points thereof passing up through both said rods F and said arms G, and both fastened by the same key. A little brace also runs from the forward part of said side pieces to said arms G to stiffen them and keep them in place. The other ends of said arms G extend forward, and are fastened to either side of said beam B B, directly under said marker, by means of a bolt through the ends of said arms and through said beam, with a nut or key on or through one end. Onto said lower rod, which connects said side pieces, A, are run some six short iron pieces, B, by means of holes through them near the forward ends of them, made straight on the under side, and narrower on the under side than the upper, and rounded or sharpened on the upper side, so as to come to a point or edge somewhat like the sharpened end of a wedge at the forward end at the under side, thus making the under side on a straight line with the point. Through the hind ends of said pieces B passes another rod, the ends of which rest on the lower side of a gain, a few inches in length, cut into the hind edge of said side pieces, A, the lower side of said gain being at a point to bring said two last-named rods nearly on a level with each other.

Between the hind ends of said pieces B are placed the ends of five other bars of iron, C, fastened there by the hind one of said rods passing through them, the other ends of which bars C drag on the ground, and are sharpened like a wedge at the forward end, and the under side is made narrower than the upper side. Between the forward ends of said pieces B, and on said rod which passes through them, are rings to keep them apart and let the dirt down between them as the digger goes forward, which rings are the same width as said bars C. When the digger is not in operation the under side of said pieces B are a little elevated from the ground. To the top and midway of said rod F is fastened, by a bolt, the clevis-shaped piece of iron, between the upper ends of which, by a bolt, is fastened, at its right angle, a triangular brace, E, and to its lower part, at the hind end, is fastened another strip of iron, reaching down and fastened to said hind rod which runs through the bars C, and to the upper part of said brace E, at the top end, is fastened, by a bolt, another strip of iron, leading to and fastened to either of the bolts which fasten the ends of said crank to said forward corners of said slides G, Fig. 1, which causes the hind and forward ends of said pieces B to rise and fall as the machine moves forward, thus giving those pieces and said bars C a sort of jolting motion when the digger is in operation, thus shaking the dirt down between them and digging up the potatoes, carrying them over the pieces B and landing them high and dry behind the bars C.

When the machine is used as a hoer, as represented in Fig. 2, it runs between the rows, scoops the soil up from between the rows, and as it moves along throws it upon the sides of the rows on either side, the ends of the sideboards D being set apart, according to the distance of the rows from each other; and when it is used as a ditcher it is used the same as a hoer, the plow part running where the ditch is to be made, and said side-boards D are placed nearer and nearer together at their hind ends as the ditch deepens.

In order to deepen the ditch the plow is made to go deeper and deeper by means of the following apparatus: Put a strap of iron, made to fit, round the forward end of the beam B B, the ends of which strap are brought near together. On the upper side of the beam, and between the ends, is fastened at one end the strap of iron G $g$ by a bolt through it and through the ends of said strap. Gains or notches are cut all up and down on the forward side of said strap G $g$ to hold the forward ends of the rod H $h$ at any point desired.

H $h$ is a flat piece of iron divided into two parts at one end, and the parts fastened to either side of the plow-beam under the marker by the same bolt which holds said digger there. The strip of iron G $g$ passes through the strip H $h$, near its forward end, and the strip H $h$ is held at any point desired by said gains and a key through it on the rear side of the strip G $g$ and a pin through the strip G $g$ on the upper side of H $h$ when at any given point.

J $j$ is the ring to which to hitch the team.

As the ditch deepens, and it becomes necessary to carry the plow deeper into the ground, the rod H $h$ is raised higher and higher on the rod G $g$. On the upper side, forward end of said upper slide G, and on the under side, forward end of the lower slide G, is attached a kind of crank, made of a long and short strip of iron, one end of the long strip being fastened at the forward corners of said slides G by the bolt which holds said arms H there, the hole through it being same size as the bolt; but the holes through the slides G, through which said bolts pass, are made oblong, the longest way being crosswise of the slide, so as to let said bolt play back and forth, and thus let said slides run easily forward and back as the wheel C turns. The other end of said long strip extends nearly across the forward ends of said slides and is riveted to the forward end of said short strip, the other end of said short strip being riveted to the slide a little farther back. By this contrivance said slides G are allowed and caused to move back and forth in a straight line without binding at the sides; and in order to make said slides G play and run back and forth in the sides of said oblong box D D still more easily and without friction, there are placed in the grooves in which said slides run some little friction-rollers fastened to the inside of said grooves for said slides to bear against.

All parts of the machine are made of iron or other metal, as may be most desirable, except the beam B B and the seed-boxes and the handles C C.

What I claim as my invention, and desire to secure by Letters Patent, is—

All the various parts, constructions, combinations, and arrangements hereinbefore described for planting, hoeing, digging, and ditching, except so far as the mold-boards A, the beam B B, and the handles C C, Fig. 1, are like those of the common double mold-board plow.

NATHAN HAWKES.

Witnesses:
L. W. HOWES,
JONATHAN CROCKETT.